(No Model.) 2 Sheets—Sheet 1.
C. HARRIGAN.
SPRING VEHICLE.
No. 380,032. Patented Mar. 27, 1888.
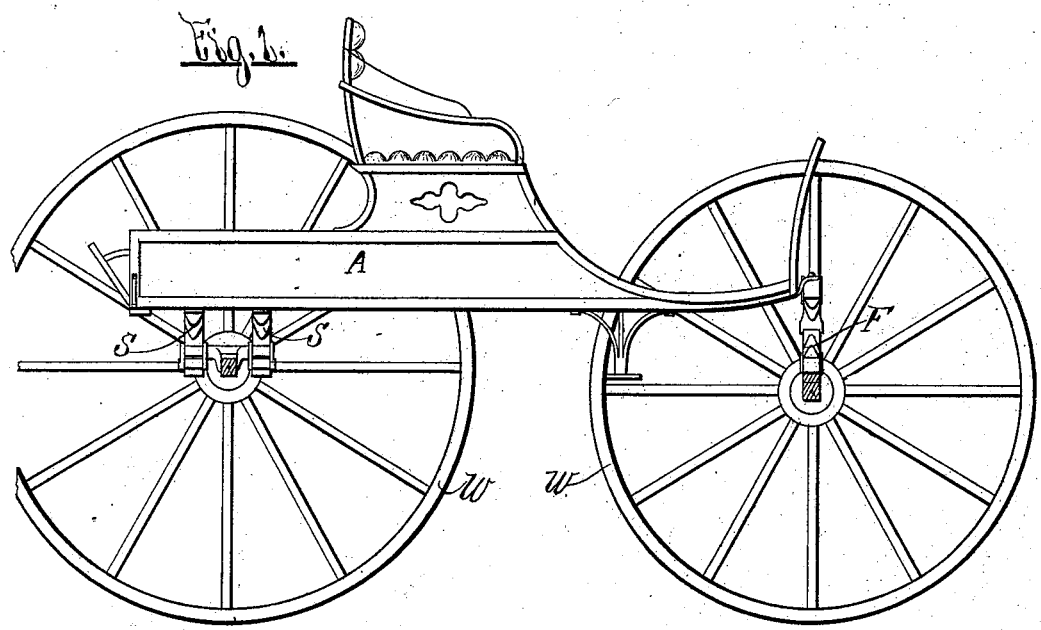
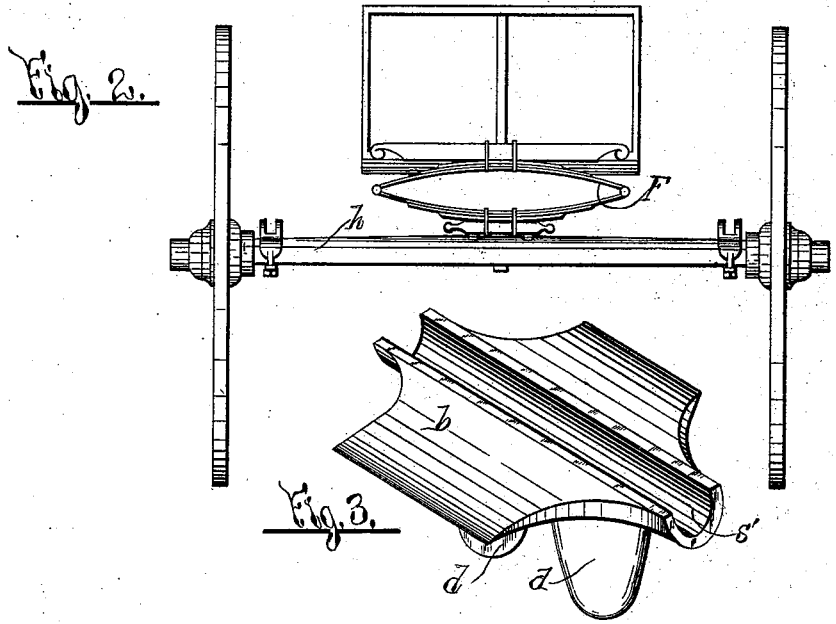
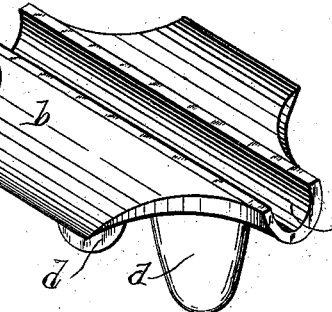
WITNESSES:
A. B. Parsons.
H. E. Chase.
INVENTOR.
Cornelius Harrigan,
BY
Hey & Gibbs.
ATTORNEYS.

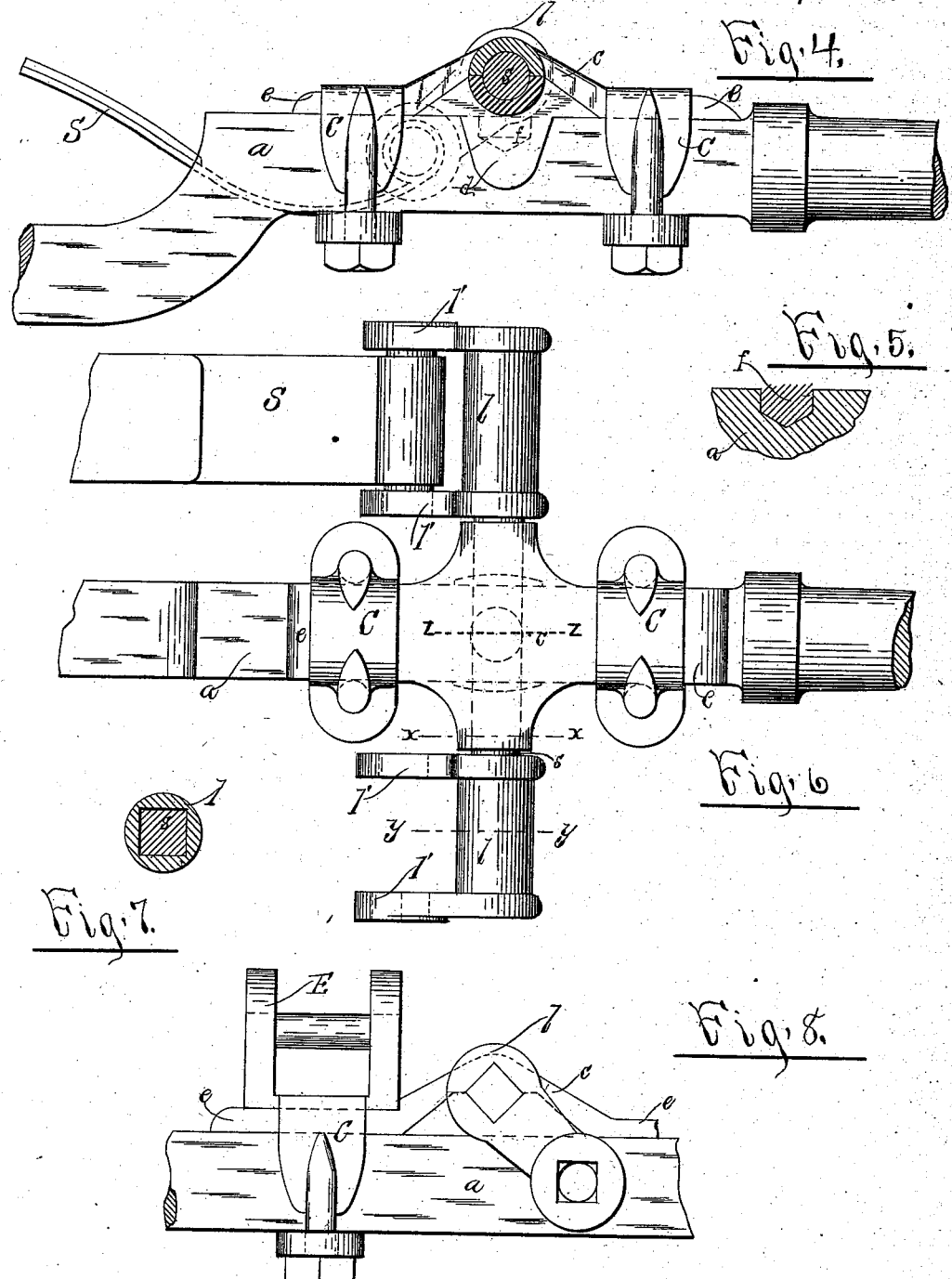

UNITED STATES PATENT OFFICE.

CORNELIUS HARRIGAN, OF ROME, NEW YORK.

SPRING-VEHICLE.

SPECIFICATION forming part of Letters Patent No. 380,032, dated March 27, 1888.

Application filed April 2, 1887. Serial No. 233,363. (No model.)

*To all whom it may concern:*

Be it known that I, CORNELIUS HARRIGAN, of Rome, in the county of Oneida and State of New York, have invented new and useful Improvements in Spring-Vehicles, of which the following, taken in connection with the accompanying drawings, is a full, clear, and exact description.

My invention relates to spring-vehicles in which springs termed "parallel cross-springs" are employed; and it consists, essentially, in the combination of the vehicle-body with parallel cross-springs connected with the rear axle and an elliptic spring secured to the forward axle.

It furthermore consists in the means for connecting the parallel cross-springs to the rear axle; also, in the detail construction and arrangement of the parts, all as hereinafter more particularly described, and pointed out in the claims.

In specifying my invention reference is had to the accompanying drawings, in which like letters indicate corresponding parts in all the figures.

Figure 1 is a side elevation of a vehicle containing my improvement, the wheels on one side of the said vehicle being removed to illustrate the connection of the springs to the axles. Fig. 2 is a front view showing the elliptical spring at the forward end of the vehicle-body. Fig. 3 is an enlarged detached view of the sectional saddle attached to the rear axle, forming the lower part of the bearing for the connecting means to secure the parallel cross-springs to the axle. Fig. 4 is an enlarged detached view of the axle, showing the securing means for connecting parallel cross-springs to the axle, the link-supporting shaft being cut through in section taken on line *x x*, Fig. 6. Fig. 5 shows a section taken on line *z z* of Fig. 6, illustrating the stud on the under side of the sectional saddle and the recess in the axle forming a seat for the stud, said device serving to prevent the sectional saddle from slipping on the axle. Fig. 6 is an enlarged detached view of the means for supporting the ends of the parallel cross-springs oppositely arranged on the rear axle. Fig. 7 shows the contour of the link-shaft in the spring-links in section taken on line *y y*, Fig. 6; and Fig. 8 is an enlarged detached view showing how the shaft-eye is secured to the forward axle when parallel cross-springs are used forward in place of the elliptic springs.

A represents a vehicle-body of any desired form and of the usual construction, to which is secured in the usual manner parallel cross-springs S S, connected to the rear axle, as presently described. The forward end of the vehicle-body is hung on the elliptic spring F, Fig. 2, W W being the wheels. The advantage accruing from the combination of the parallel cross-springs with the elliptic spring forward consists in securing economy of construction, together with great strength, durability, and a very easy riding vehicle, in which the depression of the springs is substantially equalized.

In order to secure the parallel cross-springs to the axle of the vehicle in such a manner as to prevent rattling and afford an efficient and durable connection therefor, I provide a sectional saddle, *b*, Fig. 3, which is provided with depending lugs *d d*, depending transversely to the length of the saddle, as best shown in Fig. 3, and sufficiently far apart to straddle or embrace the rear axle, *a*, as best shown in Fig. 4 of the drawings. The saddle *b* is provided with a semicircular bearing, *s'*, which forms the seat or lower half of the transverse link-bearing, which receives the ends of the separate or parallel cross-springs S S, as best shown in Figs. 1 and 6.

*c* is the cap-bearing for the sectional saddle *d*, and is provided with the extensions *e e*, Figs. 4, 6, and 8, upon which are mounted clips C C, which serve to secure the sectional saddle *d* to the rear axle, *a*, as best shown in Fig. 4 aforesaid.

In order to prevent the sectional saddle from slipping or becoming displaced by the deflection of the parallel cross-springs S S, I provide a downwardly-projecting pin or stud, *f*, Figs. 4 and 5, and provide a seat or recess, *e'*, in the axle *a*, into which the projecting pin *f* takes when the sectional saddle *b* is mounted in place on the axle *a*.

It will be observed that the cap-bearing *c* is provided with the upper part of the link-shaft bearing, and that such bearing, together with the bearing *s'* in the sectional saddle *b*, serves as a journal-bearing for the shaft and permits a free turning or oscillation of the link-shaft in its bearing on the axle as the springs S S deflect.

The link-shaft s, Fig. 6, is mounted in the bearing secured to the axle, as aforesaid, and its outer arms are squared, as shown in the sectional view, Fig. 7, and receive the links l l, Fig. 6, said links l l being provided with shackles or arms l' l', into which the ends of the parallel cross-springs S S are pivoted, as shown in Figs. 1 and 6.

It will be observed that by my invention the spring-holding links and the transverse shaft mounted in the bearing provided by the sectional saddle and cap-bearing afford a long bearing across the axle, and are firmly secured to the axle by the clips passing over the extensions e e, and in consequence thereof all rattling is prevented, which has been a very objectionable feature in the use of parallel cross-springs hung according to the methods shown in prior patents or constructions heretofore made.

Furthermore, my invention provides a very strong and durable connection for the parallel cross-springs to the axle, possessing the necessary rigidity to secure the uniform action of the parallel springs when they are deflected. Hence an easy-riding vehicle is produced by my invention.

It will be observed that the means for connecting the parallel cross-springs to the rear axle can be utilized for a like purpose in connecting parallel cross-springs to the forward axle should it be desired to construct a vehicle with two sets of parallel cross-springs on forward and rear axles. In this case it is desirable to utilize one of the extensions e in the manner shown in Fig. 8, in which the shaft-eye or shackle E is clipped on top of the extension e, in this manner affording a very durable and strong connection of the parts to the axle.

The operation of my invention will be readily understood from the foregoing. The weight, coming chiefly on the rear springs of the vehicle, is equalized by the parallel cross-springs, and, in connection with the elliptic spring forward, an easy-riding vehicle is produced, while the means for connecting the parallel cross-springs to the rear axle affords a secure and uniform working connection, preventing the rattling which has been objectionable in this class of springs heretofore.

Having thus fully described my invention, what I claim as new, and desire to secure by Letters Patent, is—

1. In combination with the axle and parallel cross-springs at the opposite side thereof, a sectional saddle secured by clips to the top of the axle, and having through its center a shaft, upon both ends of which are secured links which support the ends of the oppositely-secured parallel cross-springs, substantially as and for the purpose set forth.

2. The within-described sectional saddle, the lower part thereof being provided with depending lugs embracing the sides of the axle, and a bearing or seat for the link-supporting shaft, the upper part or cap provided with a cap-bearing to secure the link-shaft, and with extensions on each side of the cap-bearing for clips to secure the saddle to the axle, in combination with a shaft, upon both ends of which are secured links supporting the ends of separate cross-springs, substantially as and for the purpose set forth.

3. The combination of the saddle mounted on the axle, the cap-bearing c, having extensions e e, the shaft-eye E, seated on the extension e, and the clip C, securing the saddle and shaft-eye to the axle, substantially as and for the purpose set forth.

In testimony whereof I have hereunto signed my name, in the presence of two attesting witnesses, at Rome, in the county of Oneida, in the State of New York, this 24th day of March, 1887.

CORNELIUS HARRIGAN.

Witnesses:
F. B. BICKLEY,
JAMES H. SEARLES.